United States Patent [19]

Baumann et al.

[11] Patent Number: 4,620,266
[45] Date of Patent: Oct. 28, 1986

[54] FIBER-OPTIC LIGHT SYSTEM FOR MOVIE PROJECTORS

[76] Inventors: Richard R. Baumann, P.O. Box 19, Dalton, Mass. 01226; Richard I. Eldridge, 551 South St., Pittsfield, Mass. 01201

[21] Appl. No.: 609,789
[22] Filed: May 11, 1984
[51] Int. Cl.[4] ............................................... F21V 7/04
[52] U.S. Cl. ........................................ 362/32; 362/433; 350/96.1; 352/134; 352/203
[58] Field of Search ............... 350/96.24, 96.1, 96.15, 350/96.17, 96.2; 352/134, 198, 203; 362/20, 32, 253, 254, 257, 320, 433

[56] References Cited

U.S. PATENT DOCUMENTS

| | | | |
|---|---|---|---|
| 1,461,133 | 7/1923 | Marten | 352/134 |
| 3,699,651 | 10/1972 | Rueger et al. | 350/96.2 |
| 3,775,606 | 11/1973 | Bazell et al. | 350/96 B |
| 3,825,336 | 7/1974 | Reynolds | 350/96.24 |
| 3,889,245 | 8/1975 | Bernhardt | 352/72 |

Primary Examiner—Charles J. Myhre
Assistant Examiner—David A. Okonsky
Attorney, Agent, or Firm—Donald S. Holland

[57] ABSTRACT

A fiber-optic light system is disclosed for providing highly concentrated, cool light to projectors and reproducer sound heads, such as the type found in the projection room of a movie theater. The light beams onto a film to project the film's images onto a screen and release its soundtrack. In the preferred embodiment, a system is disclosed for providing fiber-optic light to a plurality of projector-and-reproducer sound sets from a single light source. A plurality of fiber-optic cables are connected to a standard xenon lamphouse, wherein each of the cables has a bifurcated "free" end with two trunks. One trunk removably connects to the projector by a coupling block that easily fits onto a mount attached to the projector's casing, while the other trunk connects to the reproducer sound head by a similar block and mount.

11 Claims, 5 Drawing Figures

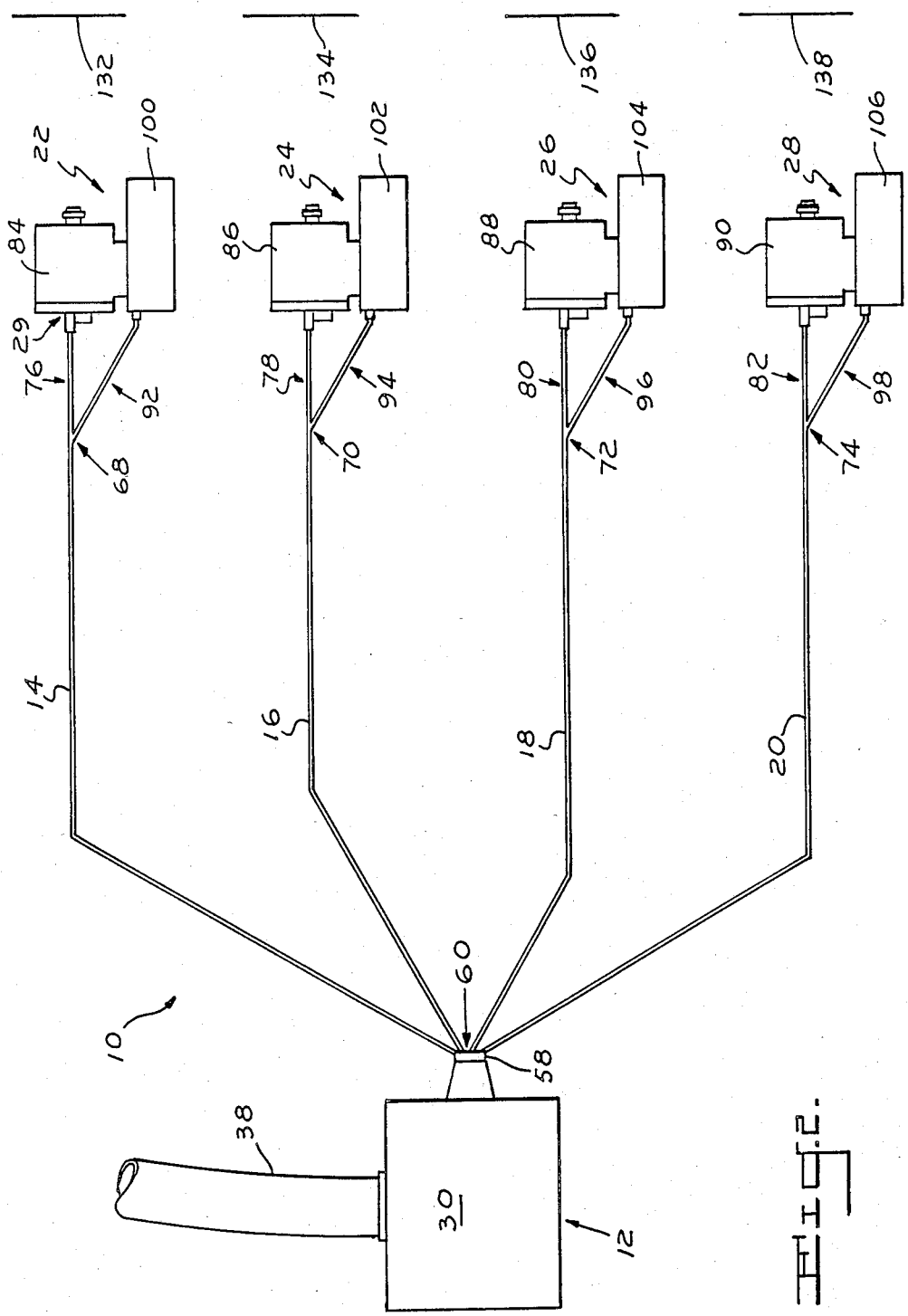

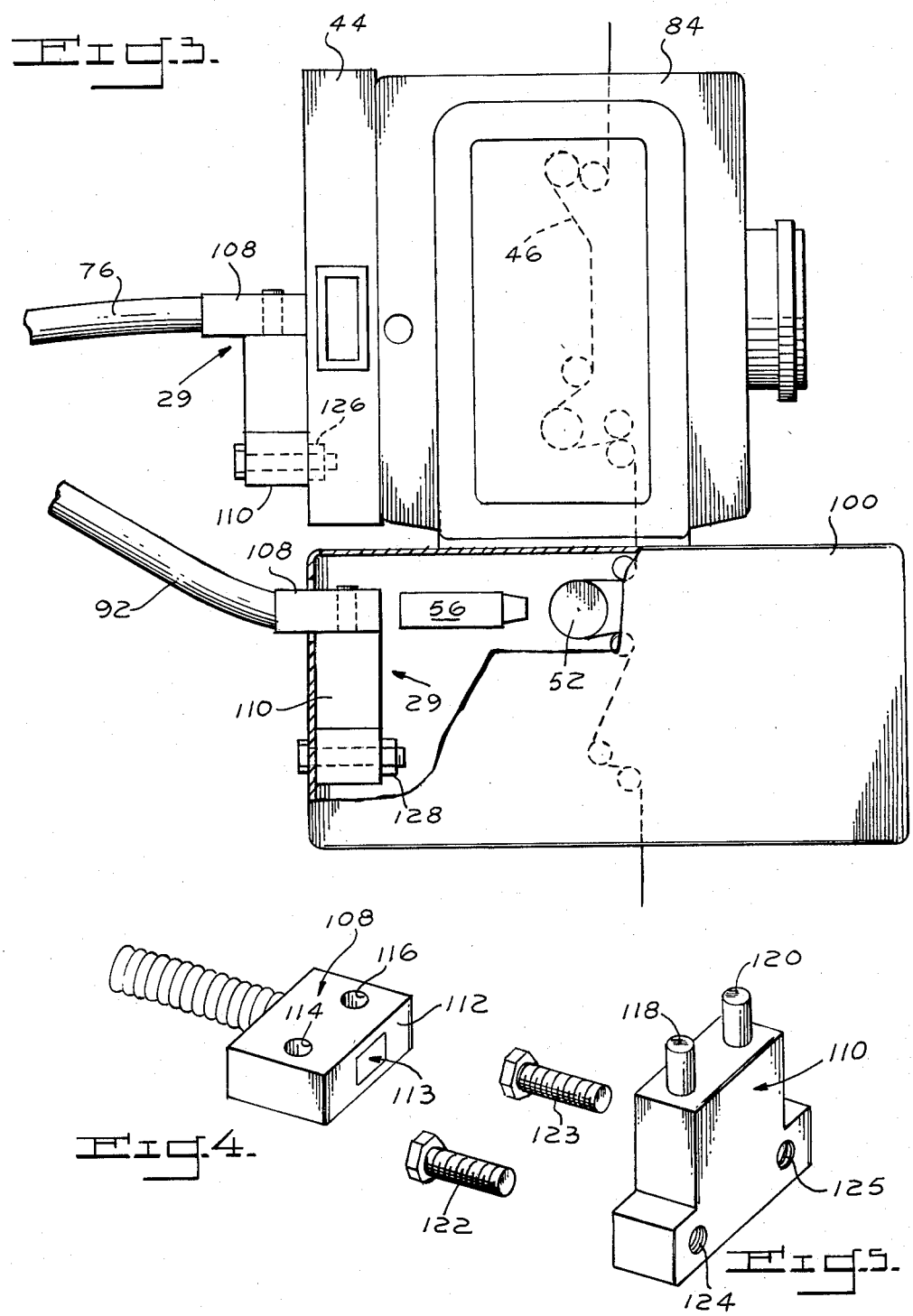

FIBER-OPTIC LIGHT SYSTEM FOR MOVIE PROJECTORS

BACKGROUND OF THE INVENTION

This invention relates to movie projectors and, more particularly, to lighting sources for projecting images and releasing sound from a reel of film in a theater.

Successful motion picture projection depends on a concentrated light source that can be conveniently imaged on a projector aperture at the film plane.

Early movie theaters were small rooms with dimly lit screens because the candlepower of the "projection light source" was too small to allow for crisp, long-range projection. Even during the heyday of silent films, theaters operated in almost complete darkness, with dim flickering images being projected onto the screen.

Prior to expanding theaters to accommodate the thousands of patrons that theater owners envisioned, better sources of light were needed for projecting the film image onto the screen. Small theaters require less candlepower to project a crisp image. However, as taught in most basic physics courses, light weakens or diffuses in inverse proportion to the square of the distance it travels. Thus, if a theater were to be doubled, for example, the candlepower had to be quadrupled to produce the same quality picture.

Eventually, low and then higher intensity carbon arc lamps were introduced to provide better light. Then, came a primary breakthrough in around 1951: the invention of the xenon arc lamp. This new high-intensity light produced about 40–80 times the amount of light projected on the screens of the first theaters.

Because the xenon arc is very concentrated, crisper images could be projected over longer distances, and theaters could be enlarged. Consequently, along with its later improvements, the xenon arc lamphouse is the preferred light source now used in modern cinemas.

While the xenon lamphouse has its advantages, it also has its drawbacks. Due to its high concentration of light, it produces an extreme amount of infrared radiation that can be easily absorbed by the film near it.

When black-and-white film overheats, it becomes soft and its projected images begin to "flutter". Adjusting the projector's focus lens will not correct the situation. If the radiant energy is increased even further, blistering will occur. At this point, the film is useless for further projection.

Color prints are not as susceptible to heat transfer as their black-and-white counterparts, since they are made of relatively transparent dyes, while the black-and-whites are made of more radiant-absorbing silver fragments. Nonetheless, color prints suffer many of the same problems, only at higher temperatures.

To obviate this problem of heat transfer, special heat shields and lenses are used in the projector and cooling ducts are attached to the lamphouse. These special shields and lenses are expensive; further, the operating costs of the cooling ducts, namely, electricity and maintenance, are often extremely high.

Similar heating problems occur with the reproducer sound heads used in conjunction with commercial projectors. In these sound reproducers, an internal light source, namely, a bulb, is used to trigger or release the sound from the film as it passes over a sound drum. Heat shields and lenses are used to direct the light from this bulb toward the drum. Too much heat and the film burns; too little and the sound is garbled. Often, the bulb burns out and needs to be replaced.

Most modern movie theaters have a plurality of cinemas. Each presently uses a separate projection light source (the xenon light adjacent the projector) and another separate sound light source (the bulb inside the sound head). The initial capital investment for this multiple equipment is prohibitive, so is its upkeep.

Accordingly, a need exists for alternative light sources that can be used more safely and economically. Preferably, these light sources must be able to illuminate the film even brighter than xenon lamps, but without the present heating problems and expense of the present lamps.

It is therefore a general object of the present invention to provide a novel, cool lighting system for projecting film images from a commercial projector onto a movie screen in a theater, wherein the system overcomes the deficiencies of the prior art.

It is another general object to provide a highly concentrated, but cool, light source that prevents degradation of film previously caused by standard light sources.

It is a more specific object to provide a highly intensified, but cool, light from a fiber-optic source that can be placed closely adjacent to the film to both crisply project the film image and release the film's sound without film degradation. This low-heat light prolongs film life and reduces fire hazard.

It is another general object to provide a fiber-optic system for distributing inexpensive cool light to a plurality of projectors from a single light source. The single light source reduces the costs previously needed to run a plurality of light sources in a theater, such as their combined electricity costs and maintenance.

It is another object to provide a novel lighting system, commensurate with the above-listed objects, that can be quickly attached to or detached from a projector and a reproducer sound head. The system requires little training for theater personnel to operate it, yet is extremely safe and durable to use.

The above and other objects and advantages of this invention will become more readily apparent when the following description is read in conjunction with the accompanying drawings.

BRIEF DESCRIPTION OF THE DRAWINGS

FIG. 2 is a schematic of a single fiber-optic light source hooked up to a plurality of simplified projectors and sound heads in accordance with the present invention;

FIG. 3 is an enlarged, fragmentary view of one projector-and-sound set shown in FIG. 2;

FIG. 4 is a perspective view of a coupling block used to quickly and removably attach a fiber-optic bundle of the invention onto the FIG. 3 projector or sound head; and, FIG. 5 is a perspective view of a T-shaped mount used to removably attach the coupling block and fiber-optic bundle onto the projector or sound head in a properly aligned position.

DETAILED DESCRIPTION OF THE PREFERRED EMBODIMENT

Figure 1:
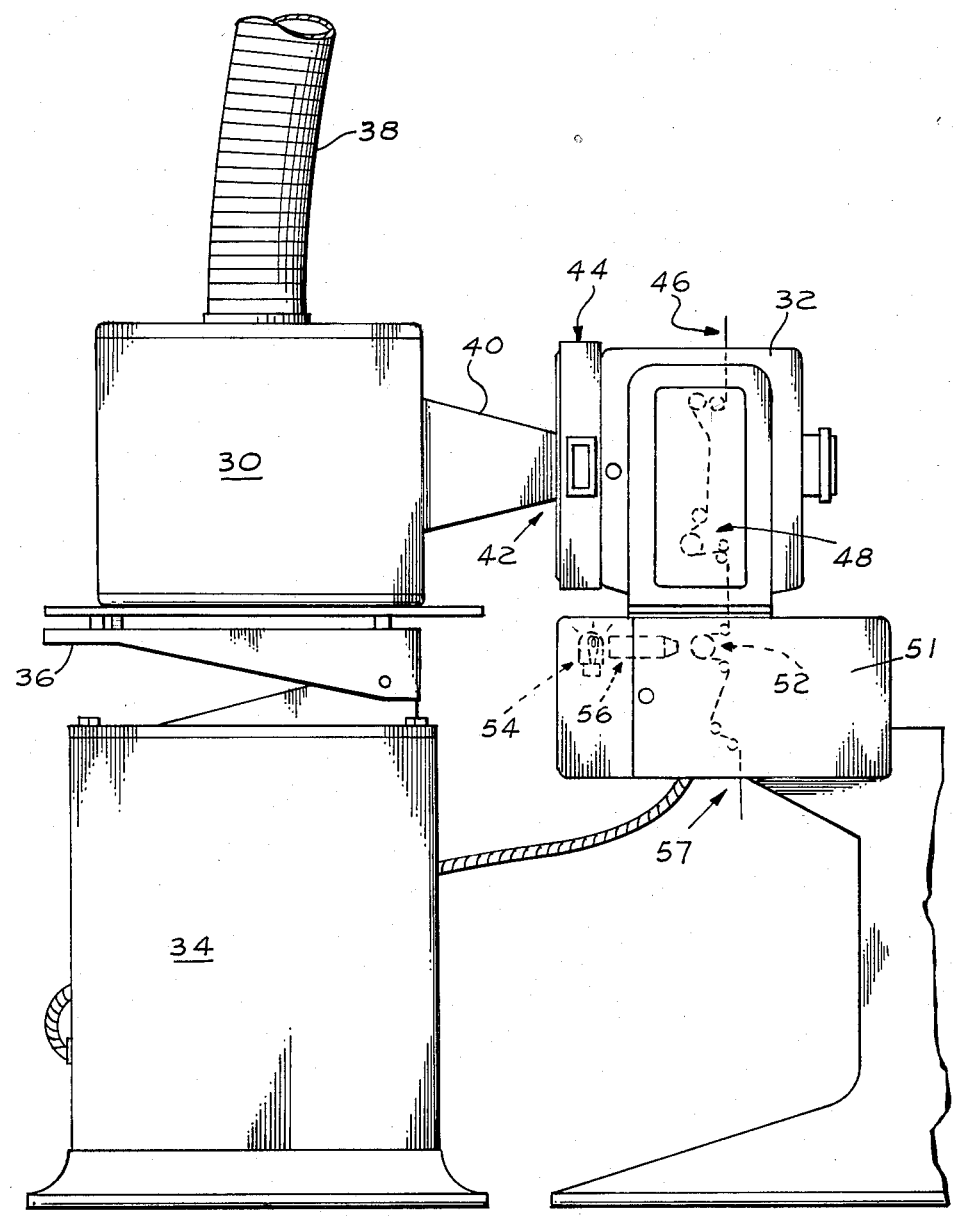
FIG. 1 is a fragmentary side-elevational view of prior equipment used in theaters, showing a standard projector, reproducer sound head and xenon light source.

Referring to the drawings in detail, a new fiber-optic lighting system for projectors and sound reproducers is shown in FIGS. 2-5 and generally designated by the reference numeral 10. The preferred system basically comprises a single, standard fiber-optic light source 12 having a plurality of bifurcated fiber-optic cables 14, 16, 18, 20 for providing cool, highly concentrated light to a plurality of projector and sound sets 22, 24, 26, 28 to both project film images onto a screen and release the accompanying soundtrack from the film. These cables can be quickly hooked up to the sets by a quick connect-/disconnect means 29.

Each of the projection and sound reproducing sets 22, 24, 26, 28 shown in FIG. 2 are simplified versions of prior equipment now used in theaters. Though a set of this prior equipment is shown in FIG. 1, it should be understood that the exact models described are examples only and should not be construed to limit the scope of the present invention. The invented system 10 can, of course, be used on other movie equipment as well.

As shown in FIG. 1, a present set of standard movie equipment usually includes a highly concentrated light source 30 (such as the illustrated KNITRON xenon arc lamphouse, Model P1000-1, manufactured by the Kneisley Electric Co. of Toledo, Ohio), for providing a "projection light source" to image or transluminate film in a single projector 32 (such as the illustrated CINECITA projector, Model SA, manufactured by Cinecita Private Ltd. of Bombay, India) onto a screen. The typical xenon light source sits on a base 34 with a height adjuster 36 and includes a heat duct 38 for removing the trouble-causing heat from the area near the film. After the height of light source 30 is adjusted, its conical outlet 40 directs light into an aperture in the projector at 42. From there, the concentrated light passes through the projector's shutter box 44 and against the film that runs through the projector. The shutter box has a two-bladed, fan-like rotating element (not shown) that strobes the light to a frequency of forty-eight—a level that is not objectionable to the viewer at the normally recommended screen brightness of sixteen footlamberts fifty-five candelas per square meter).

Film 46 enters the projector at its top from a feed reel (not shown). Standard rollers and take-up gears, such as those shown at 48, then guide the film 46 through a substantially vertical path until it exits from the bottom of the projector.

After the film exits from the projector, it then passes through an underlying reproducer sound head 51, such as Model No. 2003CI manufactured by Cinecita. Unlike some other projector and sound head sets that come manufactured as an integral unit, the illustrated set in FIG. 1 comprises a separate sound head or sound reproducer 51 that is aligned with and bolted to projector 32.

As the film passes over a sound drum 52, light from an internal bulb 54 is directed onto the film 46 via a convergent lens 56. The light then triggers the sound from the film, with the sound and the transluminated image being hopefully coordinated. Afterwards, the film exits from the bottom of the reproducer at 57 and is rewound via a take-up reel (not shown).

Unlike the prior art of FIG. 1 which requires a separate xenon lamphouse for each projection booth, the system 10 presented herein allows for a single light source to be used for a plurality of projectors. As shown in FIG. 2, a standard xenon lamphouse 30, such as the NITRON, can be placed in a location far away from the projector where its excess heat will not cause degradation of the film being shown.

In the illustrated embodiment, four sets of fiber-optic cables 14, 16, 18, 20 are removably connected to the standard xenon lamphouse 30 by any suitable means, such as the detachable cap 58. This cap is removably mounted onto the conical outlet 40 of the light source 30 by a spring-loaded, ball-and-detent arrangement (not shown). It carries the "beginning" ends of the cables (at 60) and aligns these ends with the discharged "xenon" light to allow for fiber-optic transmittal.

As shown in FIG. 2, each of the cables has an opposite, bifurcated end portion (starting at 68, 70, 72, 74), one for each projector and sound reproducer set 22, 24, 26, 28. The top trunks 76, 78, 80, 82 of the bifurcated sections are removably coupled to respective projectors 84, 86, 88, 90 to provide cool, crisp "projection light lines" to the projectors to image their various films, while the bottom trunks 92, 94, 96, 98 provide a "sound light line" to each reproducer set 100, 102, 104, 106 to trigger the soundtracks of the various films.

In the preferred embodiment, both the projection light lines and the sound light lines are connected to the projector and reproducer sound sets by virtually identical quick connect/disconnect means 29. As best shown in FIGS. 4 and 5, each connecting means 29 comprises a coupling block 108 at the end of the line that can be slipped over a T-shaped mount 110. The end portion of each line's or trunk's fiber-optic bundle passes through a central passage in block 108 and terminates substantially flush with the block's end surface 112. The tip 113 of the bundle is fixed to the block by any suitable means, such as epoxying, and is polished for optimum light transmittal.

Coupling block 108 has a pair of vertical through bores or mounting holes 114, 116, one on each end of its carried bundle, for slipping the block onto a pair of spaced, vertical locating pins 118, 120 atop the T-shaped mount 110.

As best shown in FIGS. 3 and 5, each mount 110 is fixedly attached onto a projector or sound reproducer casing via a pair of bolts 122, 123. The bolts pass through threaded through bores 124, 125 in the mount and registered holes (not shown) in the casing, where they are held in place by standard nuts (such as those shown at 126, 128 in FIG. 3). For its attachment to the projector 84, mount 110 is bolted onto the outside of the projector's casing. For attachment to the sound reproducer 100, it is bolted onto the inside of the reproducer's casing.

The attached mounts 110 are located in specific positions so that the polished ends of the projection and sound light lines 76, 92 automatically line up in their proper positions when the lines' coupling blocks 108 are slipped onto their respective mounts. When mounted, the polished end 113 of the projection light line aligns substantially perfectly with projector aperture 42 to beam a highly ooncentrated, but cool, light in a substantially exact location against the film to transluminate the film's image onto a screen, such as screens 132, 134, 136, 138 shown in FIG. 2. Similarly, the polished end of the sound light line aligns substantially perfectly with the convergent lens 56 in the sound reproducer 100 to precisely beam another cool light onto the sound drum to completely and crisply release the film's soundtrack.

Besides allowing for perfect alignment of the light sources, the quick connect/disconnect means 29 is virtually foolproof. Its simple structure permits the fiber-optic cables to be easily hooked up to or disconnected from a projector and sound reproducer set by even a non-mechanically oriented person.

It should be noted that the present invention allows for more economical equipment to be used in movie theaters. As is evident from FIGS. 2 and 3, a single xenon light source can be used for a plurality of projectors. No longer does a theater owner need to purchase an expensive, separate lamphouse for each projector. Further, the present invention 10 does away with the heavy expenses, e.g., electricity and maintenance, for operating a plurality of lamphouses.

In addition, the present invention allows for less expensive projectors and sound reproducers to be used. In the aforementioned preferred embodiment, standard projectors and sound reproducers have been described in an effort to show that existing equipment can be easily modified to enjoy the invention's benefits: the only modification basically being attachment of the mounts 110 to the projector and sound reproducer casings and the removal of bulb 54 from the inside of the reproducer. It should however be understood that the present invention does away with the need of expensive heat shields and mirrors that are presently used in standard projectors to control the heat exhausted by their adjacent xenon lamphouses. With the present invention, the xenon light source can be located a comfortable distance away, where its heat is no longer a factor. Consequently, these mirrors and shields can be done away with. The fiber-optic light provided by the present invention is a relatively cool source that simply does not need these expensive extras.

Another modification is contemplated with the present invention. With the present invention, the shutter box 44 for standard projectors may be eliminated. It should be possible to strobe the light for all of the fiber-optic cables 14, 16, 18, 20 by a single device located within the lamphouse 30 or just outside of it, upstream of the beginning ends of the cables.

It should be understood by those skilled in the art that obvious structural modifications can be made without departing from the spirit or scope of the present invention. For example, the present invention can be utilized with a single projector and sound reproducer set instead of a plurality of them. In that event, the xenon lamphouse could be located a far enough distance away so that, again, its heat would not have a deleterious effect on the film being shown. Accordingly, reference should be made primarily to the appended claims, rather than the foregoing specification, to determine the scope and spirit of the invention.

Having thus described the invention, what is claimed is:

1. A fiber-optic light system for projectors and sound reproducers comprising:
   (a) a fiber-optic light source;
   (b) a plurality of fiber-optic cables attached adjacent to the light source for transmitting fiber-optic light through them, wherein each of the cables has one end connected adjacent to the light source and an opposite, free end with a coupler fixedly attached to it;
   (c) a plurality of projectors and reproducers sound sets, wherein each set comprises a projector and an associated reproducer sound head; and,
   (d) said projectors and sound heads each having an attached mount adapted to removably receive one of said couplers and its attached cable end, wherein a cable is removably attached to the projector of each of said projector and reproducer sound sets by a pair of said couplers and mounts to transluminate a film's images from a set's projector onto an adjacent screen and another cable can be removably attached to that projector's associated sound head to release the soundtrack from the film.

2. The light system of claim 1 wherein each cable has a bifurcated free end with two trunks, wherein one trunk connects to the projector of one of said projector and reproducer sound sets and the other trunk connects to that set's sound head.

3. The light system of claim 2 wherein each trunk has a coupling block attached to its free end, said block having a pair of vertical through bores that are adapted to slip over a pair of upstanding locating pins on an associated one of said mounts to removably connect the block and mount together.

4. A fiber-optic light system for projectors and sound reproducers comprising:
   (a) a fiber-optic light source;
   (b) a plurality of fiber-optic cables attached adjacent to and extending from the light source for transmitting fiber-optic light from the source, wherein each of the cables has a bifurcated free end with two trunks;
   (c) a plurality of projectors and reproducer sound sets, wherein each set comprises a projector and a reproducer sound head; and,
   (d) coupling means for removably connecting each bifurcated end to a respective projector and reproducer sound set, wherein one trunk of said bifurcated end is removably connected to the projector of said respective set to transluminate a film's images from that projector onto a screen and a remaining trunk of said bifurcated end is removably connected to the sound head of said respective set to release the soundtrack from the film.

5. The light system of claim 4 wherein the coupling means comprises a coupling block attached to a free end of each trunk and a pair of mounts respectively attached to the projector and sound head of each projector and reproducer sound set, wherein each block has a pair of vertical through bores that are adapted to slip over a pair of upstanding locating pins on an associated one of said mounts to removably connect the block and mount together.

6. A fiber-optic light system for projectors and sound reproducers comprising:
   (a) a fiber-optic light source having a plurality of fiber-optic bundles attached adjacent to the light source for transmitting fiber-optic light, wherein each bundle has a free end with a coupler fixedly attached to it;
   (b) a projector and an associated reproducer sound head; and,
   (c) said projector and sound head each having an attached mount adapted to removably receive one of said couplers and its attached bundle end, wherein one of said bundles is removably attached to the projector to transluminate a film's images from the projector onto a screen and a remaining one of said bundles is removably attached to the sound head to release the film's soundtrack.

7. A fiber-optic light system for projectors and sound reproducers comprising:
(a) a fiber-optic light source having a plurality of fiber-optic bundles attached adjacent to the light source for transmitting fiber-optic light, wherein each bundle has a free end extending from the source;
(b) a projector and an underlying reproducer sound head;
(c) first coupling means for removably connecting one free end of said bundles to said projector to transluminate a film's images from the projector onto a screen; and,
(d) second coupling means for removably connecting a remaining free end of said bundles to said sound head for releasing the soundtrack from the film.

8. The light system of claim 7 wherein the system includes a plurality of projector and sound sets, wherein each set comprises a projector and sound head having first and second coupling means to which the free ends of two fiber-optic bundles are respectively attached.

9. The light system of claim 7 wherein the first and second coupling means comprise a coupling block attached to each bundle's free end and a pair of mounts attached to the projector and sound head, wherein each block has a pair of vertical throughbores that are adapted to slip over a pair of upstanding locating pins on said mounts to removably connect a block and mount together.

10. In a lighting system for commercial sound reproducers used in movie theaters, the improvement comprising:
(a) a fiber-optic light source;
(b) a fiber-optic cable attached adjacent to the light source for transmitting fiber-optic light, wherein the cable has a free end with a coupler attached to it; and,
(c) a mount attached to a reproducer sound head, wherein the mount is adapted to receive the coupler to beam light from the light source and through the cable onto a film inside the sound head to release the film's soundtrack.

11. A method comprising:
(a) attaching fiber-optic cables from a single light source to a plurality of projector and reproducer sound sets, wherein each set is located in a different projection room of a theater and comprises a projector and attached sound head; and,
(b) transmitting fiber-optic light from the source amd through the cables into each projector and reproducer sound set to transluminate film images from each projector onto a respective screen and release the soundtrack from the film in each sound head.

* * * * *